Oct. 20, 1959  W. E. GLASSBURN  2,909,708
ELECTRICAL PROTECTIVE APPARATUS
Filed Jan. 26, 1956
Fig. 1.
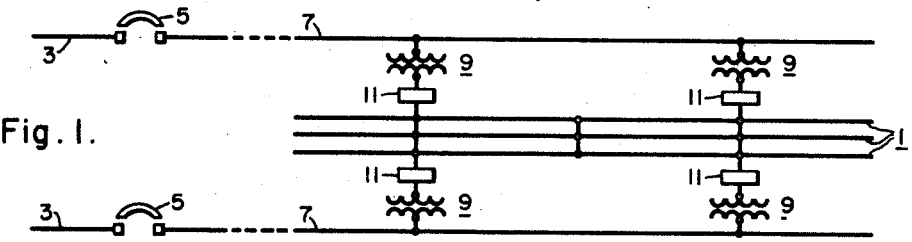
Fig. 2.
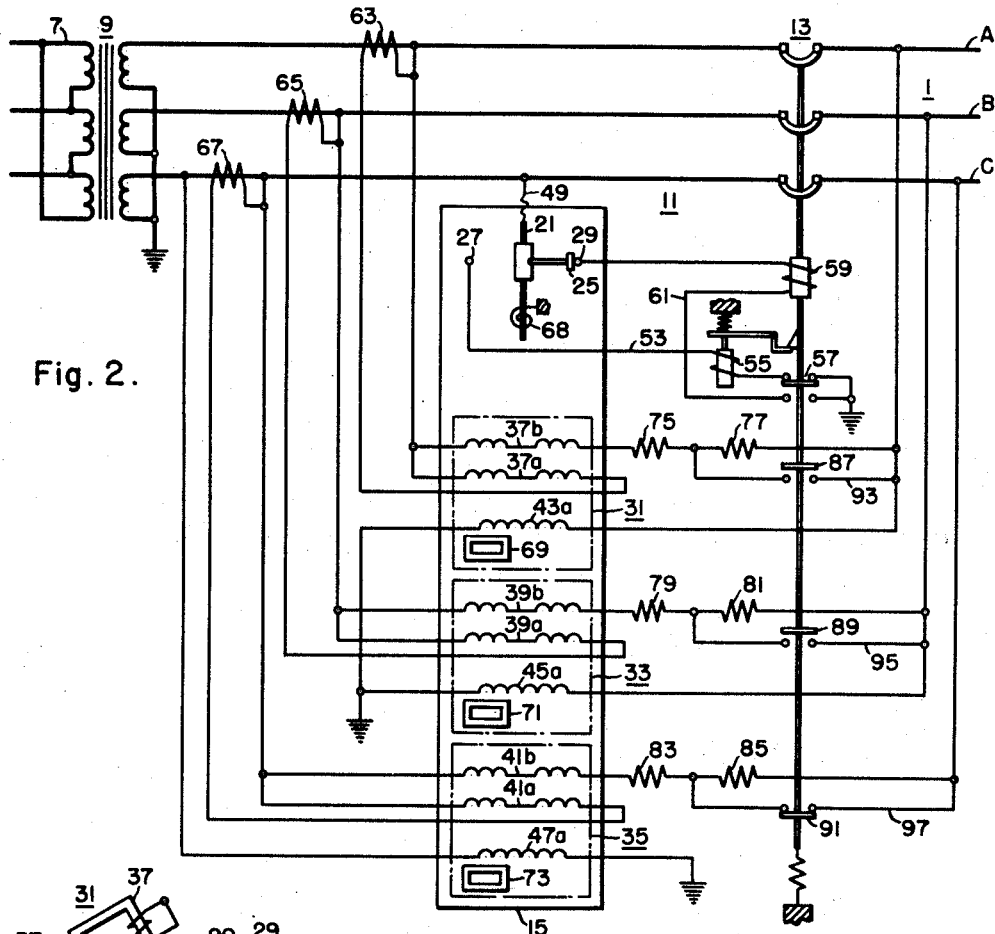
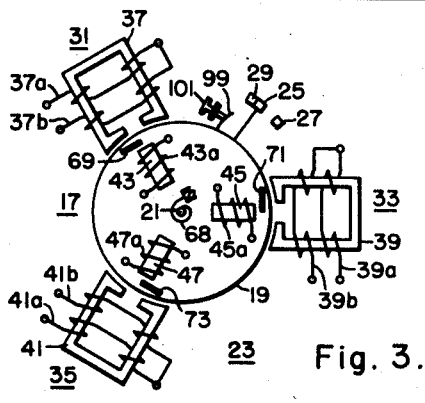
Fig. 3.
INVENTOR
William E. Glassburn.
BY
ATTORNEY

United States Patent Office 2,909,708
Patented Oct. 20, 1959

2,909,708

ELECTRICAL PROTECTIVE APPARATUS

William E. Glassburn, Bloomfield, N.J., assignor to Westinghouse Electric Corporation, East Pittsburgh, Pa., a corporation of Pennsylvania Application January 26, 1956, Serial No. 561,576

17 Claims. (Cl. 317—23)

This invention relates to electrical protective apparatus and has particular relation to automatic protectors for electrical network distribution systems.

Electrical distribution systems generally include a common network circuit which is energized by a plurality of feeder circuits connected to one or more sources of alternating current. Each feeder circuit is connected to the network circuit through a network transformer. In order to control the connection and disconnection of the feeder and network circuits, a suitable automatic protector is provided which ordinarily includes a power directional relay for controlling a circuit breaker positioned between the transformer secondary and the network circuit.

The relay is designed to trip the breaker in response to a predetermined reverse power flow from the network circuit to the feeder circuit for disconnecting the feeder circuit from the network circuit. The relay is also designed to close the breaker for reconnecting the feeder circuit to the network circuit when voltage conditions of the feeder and network circuits are such as to permit the flow of power from the feeder circuit to the network circuit. The flow of power in the reverse direction may result from a fault condition in the feeder circuit in which event reverse power flow from the network circuit to the fault is of considerable magnitude. Reverse power flow may also occur from the network circuit to the transformer secondary when the feeder circuit is disconnected from its energizing source. Such disconnection results in the flow of magnetizing current required by the associated transformer.

The relay is ordinarily arranged for energization by the in-phase or core loss component of the magnetizing current for disconnecting the feeder circuit from the network circuit. The magnitude of this in-phase component may vary considerably for different systems. For example, power transformers, which are presently constructed for distribution purposes, include magnetic cores which are formed of relatively low loss magnetic materials as compared to the cores of transformers heretofore constructed for such purposes. Consequently, the in-phase component of magnetizing current required by modern transformers is considerably less than the component required by older transformers.

It has been observed that the in-phase component of magnetizing current required by modern transformers has a magnitude which is approximately .1% of the full load network current at 100% network voltage as compared to a magnitude on the order of .2% of full load network current at 100% network voltage for older transformers. As a result, network protectors heretofore constructed for use in connection with distribution systems exhibit a reverse current tripping characteristic which is inadequate for protecting distribution systems which employ modern power transformers.

It has been observed further that when the network voltage of the system is reduced from the 100% value, the value of the in-phase component of magnetizing current is also reduced. For such reduced voltage condition, it is very desirable that a network protector operate effectively in response to the resulting reduced in-phase component to disconnect the feeder and network circuits. Protectors heretofore constructed have also provided inadequate protection under this condition of reduced voltage.

According to the present invention, an automatic protector is provided for protecting network distribution systems which exhibits improved reverse current tripping characteristics. The protector includes a power directional relay constructed so as to operate in response to extremely small values of the in-phase component of magnetizing current required by modern power transformers at 100% network voltage which flows as a result of the disconnection of an associated feeder circuit from its energizing source. The relay is further arranged to operate effectively in response to reduced values of the in-phase component resulting from reductions of the network voltage from the 100% value.

In a preferred embodiment of the invention a protector is provided including a power directional relay of the induction type for employment in connection with polyphase circuits. The relay includes a rotor structure which may be in the form of an electroconductive armature mounted for rotation between circuit breaker tripping and closing positions. Rotation of the armature is controlled by a number of applied torques certain of which are developed in response to energization of an electromagnetic stator structure. The stator structure includes three electromagnetic elements positioned to act upon the armature with each element including a magnetic structure having voltage, current and phasing windings arranged for energization from the distribution system.

According to the invention the voltage windings of two of the elements are arranged for energization in accordance with voltages at the network circuit side of the breaker whereas the voltage winding of the third element is arranged for energization in accordance with voltage at the transformer side of the breaker. Each of the current windings is arranged for energization in accordance with current flowing in the network circuit. The phasing windings are arranged for energization in accordance with voltage appearing across the open contacts of the circuit breaker when the breaker is in a tripped condition.

The voltage and current windings cooperate to establish when energized in response to the flow of reverse magnetizing current a watt torque which is applied to the armature for urging the armature toward the tripping position. The resultant watt torque is dependent upon the magnitudes of the energizing voltages and currents and the phase relationships thereof. It is noticed also that the watt torque is dependent upon the first power of such energizing voltages. On the other hand, the voltage and phasing windings cooperate to establish when energized, a phasing torque when the breaker is in the tripped condition which is applied to the armature to urge the armature toward the breaker closing position. The resultant phasing torque is dependent upon the magnitudes of the energizing voltages and the phase relationship thereof.

The invention further provides means for establishing control torques for application to the armature other than the watt and phasing torques above described. One control torque is applied to the armature to continuously urge the armature toward the tripping position to supplement the watt torque. This torque is conveniently established by a suitable spiral spring which is connected to the rotor and stator structures to bias the armature toward the breaker tripping position. Another control torque is established to urge the armature toward the breaker closing position. This torque is made dependent upon the square of voltages at both the transformer and network circuit side of the breaker. This torque may be referred to as a voltage only torque and is arranged to provide desirable tripping characteristics of the protector under conditions wherein the value of the network voltage is reduced from the normal 100% value.

By proper selection of the several torques above described a network protector may be provided which exhibits extremely desirable breaker tripping and closing characteristics. When reverse magnetizing current flows from the network circuit to the transformer secondary in response to disconnection of the feeder circuit from its energizing source, the resulting small watt torque is supplemented by the spiral spring torque. As a result the relay will operate to trip the breaker in response to extremely small values of the in-phase component of the reverse magnetizing current.

Furthermore, when the network voltage is reduced to a value which is less than the 100% value both the watt torque and the voltage only torque are also reduced in magnitude. Inasmuch as the voltage only torque is dependent upon the square of the voltages producing it, and the watt torque is dependent only upon the first power of the voltages causing it, the voltage only torque is decreased to a greater extent than the watt torque whereby the net torque acting on the armature to urge the armature to the breaker tripping position is increased.

It is desirable under conditions wherein the feeder circuit is energized and the network circuit is in a deenergized condition that the protector operate to connect the feeder and network circuits. In protectors constructed heretofore this operation has been effected by means of a spiral spring which is connected to the rotor and stator structures to urge the armature toward the breaker closing position. In the present invention such action is accomplished by the connection of one of the voltage windings for energization in accordance with voltage at the transformer side of the circuit breaker. The invention further provides a protector wherein suitable impedance means are connected in series circuit relation with the phasing windings having magnitudes variable in accordance with operation of the protector. This arrangement assists in providing desirable operating characteristics of the protector.

It is therefore an object of the invention to provide an improved automatic protector for electrical network distribution systems.

It is another object of the invention to provide an automatic protector for network distribution systems having improved reverse current tripping characteristics.

It is a further object of the invention to provide an automatic protector for network distribution systems including a power directional relay which is responsive to extremely small values of the in-phase component of reverse magnetizing current required by a power transformer included in the distribution system.

It is still another object of the invention to provide an automatic protector for network distribution systems including a power directional relay which is responsive to reduced values of the in-phase component of magnetizing current resulting from reductions of the magnitude of the network voltage.

Other objects of the invention will become apparent from the following description taken in conjunction with the accompanying drawings in which:

Figure 1 is a diagrammatic view of a distribution network circuit;

Fig. 2 is a diagrammatic view of an automatic network protector embodying the teachings of the invention; and Fig. 3 is a view in top plan of a relay included in the protector of Fig. 2 with parts removed.

Referring to the drawings there is shown in Fig. 1 a network circuit 1 connected for energization from one or more sources 3 of alternating current through feeder circuit breakers 5 and feeder circuit 7. The sources 3 may comprise station buses or other sources of alternating current.

Each of the feeder circuits 7 is connected to the network circuit 1 through one or more network transformers 9 and network protectors 11. Although only two feeder circuits 7 are illustrated in Fig. 1, it is to be understood that as many feeder circuits as desired may be employed for suppling power to the network circuit 1. In a similar manner, the number of protectors 11 and transformers 9 may be varied as desired.

In Fig. 2 there is illustrated in detail one of the protectors 11 of Fig. 1. The network circuit 1 in Fig. 2 is illustrated in the form of a polyphase network having three-phase conductors represented by the letters A, B and C. These phase conductors are connected to the secondary winding of one of the transformers 9 through a network circuit breaker 13 forming part of the protector 11 of Fig. 1. The windings of the transformer 9 may be connected in various ways, but for purposes of illustration the secondary windings are illustrated in a Y connection with a grounded neutral and the primary windings in a delta connection.

In order to control operation of the breaker 13 the protector 11 includes a suitable relay unit 15 preferably of the power directional induction type. The relay 15 may be constructed in the manner illustrated in Fig. 3. As there shown the relay 15 includes a rotor structure 17 comprising an electroconductive armature 19 which is preferably of cup-shaped configuration. The armature is mounted for rotation about an axis by means of a shaft 21 under the influence of shifting magnetic fields established in response to energization of an electromagnetic stator structure 23. A suitable electroconductive contact 25 is secured to the armature 19 for rotation therewith between a pair of fixed contacts 27 and 29 which represent, respectively, breaker tripping and breaker closing positions.

The stator 23 includes a plurality of electromagnetic elements 31, 33 and 35 shown spaced angularly about the axis of the shaft 21. The electromagnetic elements include, respectively, magnetic structures 37, 39 and 41 positioned externally of the cup-shaped armature having current windings 37a, 39a and 41a and phasing windings 37b, 39b and 41b. The elements further include magnetic structures 43, 45 and 47 which are positioned internally of the cup-shaped armature having voltage windings 43a, 45a and 47a. The several windings of each electromagnetic element are effective when energizd to produce magnetic fluxes which cooperate to establish a shifting magnetic field for developing a torque which is applied to the armature 19.

As described more fully hereinafter reverse power flow from the network circuit 1 to the feeder circuit 7 of Fig. 2 is effective to cause movement of the contact 25 into engagement with the tripping contact 27. Engagement of the contacts 25 and 27 establishes a tripping circuit from the phase conductor C through a conductor 49, the shaft 21, the contacts 25 and 27, a conductor 53, a tripping solenoid 55 for the breaker 13, and a switch 57 of the breaker 13 to ground. Consequently, engagement of the contacts 25 and 27 results in tripping of the breaker 13 to disconnect the network circuit 1 from the transformer 9.

When the breaker 13 is tripped the switch 57 is moved in a direction to break the above-described tripping circuit for deenergizing the solenoid 55 and to partially establish a closing circuit which includes a closing solenoid 59 for the breaker 13. When voltages of the feeder and network circuits are of the proper magnitude and phase to permit power flow from the feeder circuit 7 to the network circuit 1, the contact 25 will be moved into engagement with the contact 29. Engagement of the contacts 25 and 29 fully establishes the closing circuit from the phase conductor C, the conductor 49, the shaft 21, the contacts 25 and 29, the solenoid 59, a conductor 61, and the switch 57 to ground. This effects energization of the solenoid 59 to close the breaker 13 for connecting the network circuit 1 to the transformer 9.

In order to automatically disconnect the network circuit 1 from the feeder circuit 7 when the feeder circuit is disconnected from its energizing source, automatic protectors have been provided which include power directional relays designed for operation to trip an associated circuit breaker in response to the resulting flow of reverse magnetizing current from the network circuit to an associated power transformer. At the present time power transformers constructed for employment in distribution systems incorporate magnetic cores formed of low loss magnetic materials as compared to the cores of older type transformers. As a result, automatic protectors designed for use in connection with systems incorporating such older transformers exhibit reverse current tripping characteristics which are inadequate to provide proper protection for systems which incorporate modern transformers.

According to the present invention, an automatic protector is provided which exhibits improved reverse current tripping characteristics. For this purpose, the relay 15 includes means constructed and arranged for applying a number of control torques to the armature 19 effective to urge the armature to the breaker tripping position in response to extremely small values of the in-phase component of the reverse magnetizing current flowing from the network circuit 1 to the transformer 9.

In order to control operation of the relay 15, the several voltage, current and phasing windings are connected for energization from the system in the manner shown in Fig. 2. According to the invention a pair of the votlage windings are connected to the network circuit side of the breaker 13 for energization in accordance with phase voltages of the network circuit, and the remaining voltage winding is connected to the transformer side of the breaker for energization in accordance with voltage of the feeder circuit 7. This is shown in Fig. 2 wherein the voltage winding 43a is connected for energization in accordance with the voltage between the phase conductor A and ground on the network side of the breaker. In a similar manner, the voltage winding 45a is connected for energization in accordance with voltage between the phase conductor B and ground at the network side of the breaker. The voltage winding 47a, however, is shown connected between the phase conductor C and ground for energization in accordance with voltage at the transformer side of the breaker 13. The current windings 37a, 39a and 41a are connected respectively for energization in accordance with currents in the phase conductors A, B and C through current transformers 63, 65 and 67.

With this arrangement the several voltage and current windings cooperate to establish when energized in response to the flow of reverse magnetizing current a watt torque which is applied to the armature for urging the armature toward the tripping position. The resultant watt torque is dependent upon the magnitudes of the energizing voltages and currents and the phase relationships thereof. It is also observed that the watt torque is dependent upon the first power of the energizing voltages.

As further shown in Fig. 2, the phasing windings 37b, 39b and 41b are connected respectively for energization in accordance with voltages appearing across the open contacts of the breaker 13 in the phase conductors A, B and C when the breaker is in a tripped condition. The resultant phasing torque is dependent upon the magnitudes of the energizing voltages and the phase relationships thereof.

The invention further provides means for applying additional torques to the armature 19 to control operation of the breaker 13. According to the invention, means are provided for applying a torque to the armature effective to continuously urge the armature toward the tripping position. For this purpose, a spiral spring 68 is conveniently employed which is connected to the shaft 21 and the stator structure so as to continuously bias the contact 25 toward the contact 27. It is observed that this arrangement assists in providing a substantial reduction of the value of the in-phase component of the reverse magnetizing current required to trip the breaker 13 as compared to that required in prior art protectors. This is for the reason that the spiral spring torque supplements the small watt torque which is produced in response to the flow of reverse magnetizing current.

Means are further provided according to the invention to establish an additional torque for application to the armature for urging the armature toward the breaker closing position. Such means are arranged so that the relay 15 will operate effectively to trip the breaker 13 under conditions wherein the value of the network voltage is reduced from the normal 100% value resulting in a decrease of the in-phase component of magnetizing current. This torque is conveniently provided by means of a plurality of electroconductive shading loops 69, 71 and 73 which are positioned respectively to intercept magnetic flux produced by energization of the voltage windings 43a, 45a and 47a.

As shown in Fig. 3 the several shading loops are asymmetrically positioned relative to the associated voltage poles to establish a resultant voltage only torque which urges the armature 19 toward the closing contact 29. It is observed that with such arrangement a voltage only torque is established which is dependent upon the square of voltages at both the transformer and network circuit side of the breaker 13. Consequently, when the network voltage is reduced below the normal 100% value, the voltage only torque is decreased to a greater extent than the watt torque to thereby cause an increase in the net torque urging the armature to the tripping position.

In order to control the closing operation of the relay for reconnecting the feeder circuit 7 to the network circuit 1 when the feeder circuit is disconnected from the network circuit, the several phasing and voltage windings are arranged to establish when energized a resultant phasing torque which is applied to the armature to urge the armature toward the breaker closing position. This phasing torque is effective to rotate the armature to the breaker closing position when the voltages of the feeder and network circuits have magnitudes and phase relations which permit power flow from the feeder circuit to the network circuit.

The magnitude of the phasing torque may be controlled by suitable impedance means which are connected in series circuit relation with the phasing windings 37b, 39b and 41b. By varying the magnitudes of such impedance means in accordance with operation of the protector, certain desirable operating characteristics of the protector may be realized. For example, when the breaker 13 is closed, it is desirable that the magnitudes of the impedance means be sufficient to limit current flow through the several phasing windings to an acceptable value. On the other hand, when the breaker 13 is in a tripped condition, it is desirable that the magnitudes of the impedance means be reduced from the values thereof when the breaker is in a closed condition in order to permit the establishment of a phasing torque effective to close the breaker 13. It is further desirable when the breaker is in a tripped condition that the magnitude of the impedance means in series with the phasing winding 41b be somewhat greater than the magnitudes of the impedance means in series with the windings 37b and 39b, but sufficiently small so as to permit establishment of a phasing torque effective to close the breaker 13 when the feeder circuit 7 is energized and the network circuit 1 is in a deenergized condition.

As illustrated in Fig. 2, a separate pair of impedance elements are connected in series circuit relation with each of the phasing windings 37b, 39b and 41b. As there shown, a pair of resistors 75 and 77 are connected in series with the winding 37b. In a similar manner, resistors 79 and 81 are connected in series with the winding 39b, and resistors 83 and 85 are connected in series with the winding 41b. In order to vary the magnitudes of the several series-connected impedance means in accordance with operation of the protector, the breaker 13 includes a plurality of switches 87, 89 and 91 positioned to control the establishment of a plurality of shunt circuits 93, 95 and 97 provided for the resistors 77, 81 and 85, respectively.

With the breaker 13 in a closed condition as shown in Fig. 2, the switches 87 and 89 are positioned such that the shunt circuits 93 and 95 are in a disestablished condition whereas the switch 91 is positioned to establish the shunt circuit 97. Consequently, the resistors 77 and 81 are connected respectively in series with the resistors 75 and 79, and the resistor 85 is effectively short circuited. When the breaker 13 is in a tripped condition, the reverse is true with the resistors 77 and 81 being effectively short circuited and with the resistor 85 connected in series with the resistor 83.

It has been observed that desirable operating characteristics may be obtained by selecting the several resistors such that the sum of the resistances of the resistors 79 and 81 is equal to the sum of the resistances provided by the resistors 75 and 77. The invention further provides that the resistance of the resistor 83 be substantially equal to the sum of the resistances provided by the resistors 79 and 81 or the resistors 75 and 77. Excellent results have been obtained by selecting the several resistors to have the following values:

| | Ohms |
|---|---|
| Resistor 75 | 1200 |
| Resistor 77 | 1900 |
| Resistor 79 | 1200 |
| Resistor 81 | 1900 |
| Resistor 83 | 3100 |
| Resistor 85 | 9000 |

In order to further control operation of the protector, means are provided according to the invention for establishing an additional torque which is applied to the armature to urge the armature toward the tripping position when the armature is rotated toward the closing position, but which is ineffective when the armature is moved toward the tripping position. Such additional torque is conveniently provided by a leaf spring 99 secured to the shaft 21 so as to engage a suitable stop member 101 when the armature is rotated toward the closing position. This arrangement is illustrated in Fig. 3, wherein the contact 25 is shown in engagement with the contact 29 to effect a closed condition of the breaker 13. It is observed that the spring 99 is in engagement with the stop 101 whereby a torque is applied to the armature which urges the contact 25 toward the contact 27. It is further observed that when the contact 25 is moved toward the contact 27, the spring 99 will become disengaged from the stop member 101 with the result that zero torque is applied to the armature by the spring 99. The stop member 101 may take the form of a screw member which is rotatably mounted by a portion of the stator structure to permit adjustment of the magnitude of the torque applied by the spring 99.

By means of the invention a network protector is provided which exhibits very desirable operating characteristics. By proper proportioning of the watt torque, voltage only torque and the spiral spring torque, the relay may be operated to trip the breaker in response to extremely small values of the in-phase component of reversed magnetizing current. The small watt torque which is established to urge the armature toward the tripping position in response to the flow of reversed magnetizing current is supplemented by the spiral spring torque. In addition, the voltage only torque which urges the armature toward the closing position is reduced in response to a reduction in the value of the network voltage from the 100% value to a greater extent than the watt torque whereby the relay operates effectively to trip the breaker.

The invention also provides a protector having desirable closing characteristics. By proper proportioning of the phasing torque, voltage only torque, spiral spring torque and leaf spring torque, the relay may be operated to close the breaker in response to voltage conditions of the feeder and network circuits which permit power flow from the feeder circuit to the network circuit. The phasing torque is conveniently controlled by suitable impedance means having magnitudes variable in accordance with operation of the protector. The impedance means are selected to provide a phasing torque sufficient to close the breaker when the feeder circuit is energized and the network circuit deenergized. The several torques also may be selected to prevent operation of the relay to close the breaker when the feeder circuit is deenergized and the network circuit is energized.

Although the invention has been described with reference to certain specific embodiments thereof, numerous modifications are possible and it is desired to cover all modifications falling within the spirit and scope of the invention.

I claim as my invention:

1. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay including an armature movable between circuit breaker tripping and closing positions in accordance with the direction of power flow between said circuits, said relay including voltage responsive means arranged for energization in accordance with voltages at both the transformer side and network circuit side of the circuit breaker, current responsive means arranged for energization in accordance with current in the network circuit, and phasing means arranged for energization in accordance with voltage across said circuit breaker contact means, said voltage and current responsive means cooperating when energized in response to power flow from said network circuit to said transformer to cause movement of said armature toward the tripping position, said voltage responsive means and said phasing means cooperating when energized in response to energizing voltage conditions occurring when the circuit breaker is in a tripped condition which permit power flow from the transformer to the network circuit to cause movement of said armature toward the closing position.

2. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, voltage winding means for the stator structure connected for energization in accordance with first voltages at both the transformer side and network circuit side of the circuit breaker, current winding means for the stator structure connected for energization in accordance with current in the network circuit, phasing winding means for the stator structure connected for energization in accordance with voltage across the circuit breaker contact means, said voltage and current winding means cooperating to develop when energized in response to power flow from the network circuit to the transformer a watt torque dependent upon the first power of said first voltages which urges the rotor structure toward the tripping position, said voltage and phasing winding means cooperating to develop when energized in response to energizing voltage conditions occurring when the circuit breaker is in a tripped condition which permit power flow from the feeder circuit to the network circuit a phasing torque which urges the rotor structure toward the closing position, and control means arranged to develop a control torque dependent upon a power of said first voltages greater than a first power which urges the rotor structure toward the closing position.

3. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, voltage winding means for the stator structure connected for energization in accordance with first voltages at both the transformer side and network circuit side of the circuit breaker, current winding means for the stator structure connected for energization in accordance with current in the network circuit, phasing winding means for the stator structure connected for energization in accordance with voltage across the circuit breaker contact means, said voltage and current winding means cooperating to develop when energized in response to power flow from the network circuit to the transformer a watt torque dependent upon the first power of said first voltages which urges the rotor structure toward the tripping position, said voltage and phasing winding means cooperating to develop when energized in response to energizing voltage conditions occurring when the circuit breaker is in a tripped condition which permit power flow from the feeder circuit to the network circuit a phasing torque which urges the rotor structure toward the closing position, control spring means secured to the stator and rotor structures to produce a net control spring torque which urges the rotor structure toward the tripping position, and control means arranged to develop a control torque dependent upon the square of said first voltages which urges the rotor structure toward the closing position.

4. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, voltage winding means for the stator structure connected for energization in accordance with first voltages at both the transformer side and network circuit side of the circuit breaker, current winding means for the stator structure connected for energization in accordance with current in the network circuit, phasing winding means for the stator structure connected for energization in accordance with voltage across the circuit breaker contact means, said voltage and current winding means cooperating to develop when energized in response to power flow from the network circuit to the transformer a watt torque dependent upon the first power of said first voltages which urges the rotor structure toward the tripping position, said voltage and phasing winding means cooperating to develop when energized in response to energizing voltage conditions occurring when the circuit breaker is in a tripped condition which permit power flow from the feeder circuit to the network circuit a phasing torque which urges the rotor structure toward the closing position, control spring means secured to the stator and rotor structures to produce a net control spring torque which urges the rotor structure toward the tripping position, first control means arranged to develop a first control torque dependent upon the square of said first voltages which urges the rotor structure toward the closing position and second control means arranged to develop a second control torque which urges the rotor structure toward the tripping position when the rotor structure is rotated toward the closing position, and which is ineffective when the rotor structure is rotated toward the tripping position.

5. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, voltage winding means for the stator structure connected for energization in accordance with first voltages at both the transformer side and network circuit side of the circuit breaker, current winding means for the stator structure connected for energization in accordance with current in the network circuit, phasing winding means for the stator structure connected for energization in accordance with voltage across the circuit breaker contact means, said voltage and current winding means cooperating to develop when energized in response to power flow from the network circuit to the transformer a watt torque dependent upon the first power of said first voltages which urges the rotor structure toward the tripping position, said voltage and phasing winding means cooperating to develop when energized in response to energizing voltage conditions occurring when the circuit breaker is in a tripped condition which permit power flow from the feeder circuit to the network circuit a phasing torque which urges the rotor structure toward the closing position, control spring means secured to the stator and rotor structures to produce a net control spring torque which urges the rotor structure toward the tripping position, first control means arranged to develop a first control torque dependent upon the square of said first voltages which urges the rotor structure toward the closing position in accordance with voltages at both the transformer side and network circuit side of the circuit breaker, second control means arranged to develop a second control torque which urges the rotor structure toward the tripping position when the rotor structure is rotated toward the closing position, and which is ineffective when the rotor structure is rotated toward the tripping position, impedance means connected in series circuit relation with said phasing winding means, and means effective in response to actuation of said circuit breaker from a closed condition to a tripped condition for varying the value of said impedance means, said impedance means having magnitudes when the circuit breaker is in a tripped condition such that the rotor structure is rotated to the closing position when the feeder circuit is energized and the network circuit is deenergized, and the rotor structure is spaced from the closed position when the feeder circuit is deenergized and the network circuit is energized.

6. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, voltage winding means for the stator structure connected for energization in accordance with first voltages at both the transformer side and network circuit side of the circuit breaker, current winding means for the stator structure connected for energization in accordance with current in the network circuit, said voltage and current winding means cooperating to develop when energized in response to power flow from the network circuit to the transformer a watt torque which urges the rotor structure toward the tripping position, control means arranged to develop a control torque which urges the rotor structure toward the closing position, and control spring means secured to the stator and rotor structures to produce a net control spring torque which urges the rotor structure toward the tripping position, said winding means, control means, and control spring means being proportioned such that the rotor structure is urged to the tripping position in response to a predetermined value of the in-phase component of reverse transformer magnetizing current flowing from the network circuit to the transformer.

7. In an electrical distribution system, a three phase network circuit, a three phase feeder circuit, a power transformer connected between said circuits for energization from said feeder circuit for normally supplying power to said network circuit, a circuit breaker actuable for controlling the connection and disconnection of said network circuit and said transformer, a separate pair of circuit breaker contacts in each phase of said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, a pair of voltage windings for the stator structure each connected for energization in accordance with a separate phase voltage at the network circuit side of the circuit breaker, an additional voltage winding for the stator structure connected for energization in accordance with the remaining phase voltage at the transformer side of the circuit breaker, a plurality of current windings for the stator structure each connected for energization in accordance with a separate phase current of said network circuit, and a plurality of phasing windings for the stator structure each connected for energization in accordance with voltage across a separate pair of circuit breaker contacts, said voltage and current windings cooperating to develop when energized in response to power flow from said network circuit to said transformer a watt torque which urges the rotor structure toward the tripping position, said voltage and phasing windings cooperating to develop when energized in response to energizing voltage conditions occurring when the circuit breaker is in a tripped condition which permit power flow from the feeder circuit to the network circuit a phasing torque which urges the rotor structure toward the closing position.

8. In an electrical distribution system, a three phase network circuit, a three phase feeder circuit, a power transformer connected between said circuits for energization from said feeder circuit for normally supplying power to said network circuit, a circuit breaker actuable for controlling the connection and disconnection of said network circuit and said transformer, a separate pair of circuit breaker contacts in each phase of said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, a pair of voltage windings for the stator structure each connected for energization in accordance with a separate phase voltage at the network circuit side of the circuit breaker, an additional voltage winding for the stator structure connected for energization in accordance with the remaining phase voltage at the transformer side of the circuit breaker, a plurality of current windings for the stator structure each connected for energization in accordance with a separate phase current of the network circuit, and a plurality of phasing windings for the stator structure each connected for energization in accordance with voltage across a separate pair of circuit breaker contacts, said voltage and current windings cooperating to develop when energized in response to power flow from said network circuit to said transformer a watt torque which urges the rotor structure toward the tripping position, said voltage and phasing windings cooperating to develop when energized in response to energizing voltage conditions occurring when the circuit breaker is in a tripped condition which permit power flow from the feeder circuit to the network circuit a phasing torque which urges the rotor structure toward the closing position, separate impedance means connected in series circuit relation with each of said phasing windings, and means effective in response to actuation of said circuit breaker for varying the values of said impedance means, the impedance means for the phasing winding associated with said remaining phase having a first value which is greater than the values of the impedance means for the other phasing windings when the circuit breaker is in a tripped condition, and having a second value which is less than said first value and substantially equal to the values of the impedance means for the other phasing windings when the circuit breaker is in a closed condition.

9. In an electrical distribution system, a three phase network circuit, a three phase feeder circuit, a power transformer connected between said circuits for energization from said feeder circuit for normally supplying power to said network circuit, a circuit breaker actuable for controlling the connection and disconnection of said network circuit and said transformer, a separate pair of circuit breaker contacts in each phase of said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, a pair of voltage windings for the stator structure each connected for energization in accordance with a separate phase voltage at the network circuit side of the circuit breaker, an additional voltage winding for the stator structure connected for energization in accordance with the remaining phase voltage at the transformer side of the circuit breaker, a plurality of current windings for the stator structure each connected for energization in accordance with a separate phase current of the network circuit, said voltage and current winding means cooperating to develop when energized in response to power flow from the network circuit to the transformer a watt torque which urges the rotor structure toward the tripping position, control means arranged to develop a control torque which urges the rotor structure toward the closing position in accordance with voltages at both the transformer side and network circuit side of the circuit breaker, and control spring means secured to the stator and rotor structures to produce a net control spring torque which urges the rotor structure toward the tripping position, said winding means, control means, and control spring means being proportioned such that the rotor structure is urged to the tripping position in response to a predetermined value of the in-phase component of reverse transformer magnetizing current flowing from the network circuit to the transformer.

10. In an electrical distribution system, a three phase network circuit, a three phase feeder circuit, a power transformer connected between said circuits for energization from said feeder circuit for normally supplying power to said network circuit, a circuit breaker actuable for controlling the connection and disconnection of said network circuit and said transformer, a separate pair of circuit breaker contacts in each phase of said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, a pair of voltage windings for the stator structure each connected for energization in accordance with a separate phase voltage at the network circuit side of the circuit breaker, an additional voltage winding for the stator structure connected for energization in accordance with the remaining phase voltage at the transformer side of the circuit breaker, a plurality of current windings for the stator structure each connected for energization in accordance with a separate phase current of said network circuit, and a plurality of phasing windings for the stator structure each connected for energization in accordance with voltage across a separate pair of circuit breaker contacts, said voltage and current windings cooperating to develop when energized in response to power flow from said network circuit to said transformer a watt torque dependent upon the first power of voltages energizing said voltage windings which urges the rotor structure toward the tripping position, said voltage and phasing windings cooperating to develop when energized in response to energizing voltage conditions occurring when the circuit breaker is in a tripped condition which permit power flow from the feeder circuit to the network circuit a phasing torque which urges the rotor structure toward the closing position, control means arranged to develop a control torque dependent upon a power of the voltages energizing said voltage windings greater than a first power which urges the rotor structure toward the closing position, a spiral control spring secured to the stator and rotor structure to urge the rotor structure toward the tripping position, and second control means arranged to develop a second control torque which urges the rotor structure toward the tripping position when the rotor structure is rotated toward the closing position, and which is ineffective when the rotor structure is rotated toward the tripping position.

11. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay including an armature movable between circuit breaker tripping and closing positions in accordance with the direction of power flow between said circuits, said relay including voltage responsive means arranged for energization in accordance with voltages at both the transformer side and network circuit side of the circuit breaker, current responsive means arranged for energization in accordance with current in the network circuit, phasing means arranged for energization in accordance with voltage across said circuit breaker contact means, said voltage and current responsive means cooperating when energized in response to power flow from said network circuit to said transformer to cause movement of said armature toward the tripping position, said voltage responsive means and said phasing means cooperating when energized in response to energizing voltage conditions occurring when the circuit breaker is in a tripped condition which permit power flow from the transformer to the network circuit to cause movement of said armature toward the closing position, and control spring means secured to the stator and rotor structures to produce a net control spring torque which urges the rotor structure toward the tripping position.

12. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay including an armature movable between circuit breaker tripping and closing positons in accordance with the direction of power flow between said circuits, said relay including voltage responsive means arranged for energization in accordance with voltages at at least the network circuit side of the circuit breaker, current responsive means arranged for energization in accordance with current in the network circuit, phasing means arranged for energization in accordance with voltage across said circuit breaker contact means, said voltage and current responsive means cooperating when energized in response to power flow from said network circuit to said transformer to cause movement of said armature toward the tripping position, said voltage responsive means and said phasing means cooperating when energized in response to energizing voltage conditions occurring when the circuit breaker is in a tripped condition which permit power flow from the transformer to the network circuit to cause movement of said armature toward the closing position, and control spring means secured to the stator and rotor structures to produce a net control spring torque which urges the rotor structure toward the tripping position.

13. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay including an armature movable between circuit breaker tripping and closing positions in accordance with the direction of power flow between said circuits, said relay including voltage responsive means arranged for energization in accordance with voltages at at least the network circuit side of the circuit breaker, current responsive means arranged for energization in accordance with current in the network circuit, phasing means arranged for energization in accordance with voltage across said circuit breaker contact means, said voltage and current responsive means cooperating when energized in response to power flow from said network circuit to said transformer to cause movement of said armature toward the tripping position, said voltage responsive means and said phasing means cooperating when energized in response to energizing voltage conditions occurring when the circuit breaker is in a tripped condition which permit power flow from the transformer to the network circuit to cause movement of said armature toward the closing position, and means responsive to said voltages to effectively increase the net torque urging the armature toward the tripping position in response to a decrease in voltage of the network circuit.

14. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay including an armature movable between circuit breaker tripping and closing positions in accordance with the direction of power flow between said circuits, said relay including voltage responsive means arranged for energization in accordance with voltages at at least the network circuit side of the circuit breaker, current responsive means arranged for energization in accordance with current in the network circuit, phasing means arranged for energization in accordance with voltage across said circuit breaker contact means, said voltage and current responsive means cooperating when energized in response to power flow from said network circuit to said transformer to cause movement of said armature toward the tripping position, said voltage responsive means and said phasing means cooperating when energized in response to energizing voltage conditions occurring when the circuit breaker is in a tripped condition which permits power flow from the transformer to the network circuit to cause movement of said armature toward the closing position, and means responsive to said voltages to effectively increase the net torque urging the armature toward the tripping position in response to a decrease in voltage of the network circuit, said means including electroconductive flux lagging means associated with the voltage responsive means to apply a torque to the armature to urge the armature toward the closing position.

15. In an electrical distribution system, a network circuit, a feeder circuit, a power transformer connected between said circuits for energization from said feeder circuit for normally supplying power to said network circuit, a circuit breaker actuable for controlling the connection and disconnection of said network circuit and said transformer, circuit breaker contact means positioned between said transformer and said network circuit, and a power directional relay for controlling actuation of said circuit breaker in accordance with the direction of power flow between said circuits, said relay including a magnetic stator structure, a rotor structure mounted for rotation relative to the stator structure between circuit breaker tripping and closing positions, voltage winding means for the stator structure connected for energization in accordance with voltages at at least the network circuit side of the circuit breaker, current winding means for the stator structure connected for energization in accordance with current in the network circuit, phasing winding means for the stator structure connected for energization in accordance with voltage across the circuit breaker contact means, said voltage and current winding means cooperating to develop when energized in response to power flow from the network circuit to the transformer a watt torque dependent upon the first power of said first voltages which urges the rotor structure toward the tripping position, said voltage and phasing winding means cooperating to develop when energized in response to energizing voltage conditions occurring when the circuit breaker is in a tripped condition which permit power flow from the feeder circuit to the network circuit a phasing torque which urges the rotor structure toward the closing position, control spring means secured to the stator and rotor structures to produce a net control spring torque which urges the rotor structure toward the tripping position, and control means arranged to develop a control torque dependent upon a power of said first voltages greater than a first power which urges the rotor structure toward the closing position.

16. In a power directional network relay for controlling the connection and disconnection of network and feeder circuits in a distribution system, a magnetic stator structure, a rotor structure mounted for rotation relative to the stator structure between circuit connecting and disconnecting positions, voltage winding means for the stator structure to be energized in accordance with voltages of at least the network circuit, current winding means for the stator structure to be energized in accordance with current in the network circuit, phasing winding means for the stator structure to be energized in accordance with the difference between the network and feeder circuit voltages, and a spiral control spring secured to the stator and rotor structures to urge the rotor structure toward the circuit disconnecting position.

17. In a power directional network relay for controlling the connection and disconnection of network and feeder circuits in a distribution system, a magnetic stator structure, a rotor structure mounted for rotation relative to the stator structure between circuit connecting and disconnecting positions, voltage winding means for the stator structure to be energized in accordance with voltages of at least the network circuit, current winding means for the stator structure to be energized in accordance with current in the network circuit, phasing winding means for the stator structure to be energized in accordance with the difference between the network and feeder voltages, a spiral control spring secured to the stator and rotor structures to urge the rotor structure toward the circuit disconnecting position, and electroconductive means positioned to intercept magnetic flux produced by energization of the voltage winding means to develop a torque which urges the rotor structure toward the circuit connecting position.

References Cited in the file of this patent

UNITED STATES PATENTS

| | | |
|---|---|---|
| 1,883,839 | Webb | Oct. 18, 1932 |
| 1,997,697 | Parsons | Apr. 16, 1935 |
| 2,059,885 | McLachlan | Nov. 3, 1936 |